(12) United States Patent
Miyazawa et al.

(10) Patent No.: US 7,058,576 B2
(45) Date of Patent: Jun. 6, 2006

(54) METHOD OF CALCULATING HMM OUTPUT PROBABILITY AND SPEECH RECOGNITION APPARATUS

(75) Inventors: Yasunaga Miyazawa, Okaya (JP); Hiroshi Hasegawa, Chino (JP)

(73) Assignee: Seiko Epson Corporation, Tokyo (JP)

( * ) Notice: Subject to any disclaimer, the term of this patent is extended or adjusted under 35 U.S.C. 154(b) by 784 days.

(21) Appl. No.: 10/197,461

(22) Filed: Jul. 18, 2002

(65) Prior Publication Data
US 2003/0061044 A1     Mar. 27, 2003

(30) Foreign Application Priority Data
Jul. 24, 2001    (JP)   ................ 2001-223610

(51) Int. Cl.
    *G10L 15/14*      (2006.01)
(52) U.S. Cl. ................................... 704/256
(58) Field of Classification Search ............... None
See application file for complete search history.

(56) References Cited

U.S. PATENT DOCUMENTS

| | | | |
|---|---|---|---|
| 4,587,670 A * | 5/1986 | Levinson et al. | 704/256 |
| RE33,597 E * | 5/1991 | Levinson et al. | 704/256 |
| 5,027,406 A * | 6/1991 | Roberts et al. | 704/244 |

FOREIGN PATENT DOCUMENTS

| | | |
|---|---|---|
| JP | A-6-12089 | 1/1994 |
| JP | A-7-160288 | 6/1995 |

OTHER PUBLICATIONS

"Speech Recognition Based on Hidden Markov Model", *Journal of Acoustic Society of Japan*, vol. 42, No. 12 (1986), pp. 936-941.

* cited by examiner

Primary Examiner—David D. Knepper
(74) Attorney, Agent, or Firm—Oliff & Berridge, PLC

(57) ABSTRACT

The invention relates to speech recognition based on HMM, in which speech recognition is performed by performing vector quantization and obtaining an output probability by table reference, and the amount of computation and use of memory area are minimized while achieving a high ability of recognition. Exemplary codebooks used for vector quantization can be provided as follows: if phonemes are used as subwords, codebooks for respective phonemes, such that a codebook CB1 is a codebook for a phoneme /a/ and a codebook CB2 is a codebook for a phoneme /i/, and these codebooks are associated with respective phoneme HMMs. When a feature vector obtained by speech analysis is vector quantized based on, for example, the codebook CB1 and a code (label) is output, tables for respective states of the phoneme HMM associated with the codebook CB1 are each referred to in order to obtain state output probabilities corresponding to the label, and speech recognition is performed using the state output probabilities as a parameter.

18 Claims, 4 Drawing Sheets

METHOD OF CALCULATING HMM OUTPUT PROBABILITY AND SPEECH RECOGNITION APPARATUS

BACKGROUND OF THE INVENTION

1. Field of Invention

The present invention relates to a method of calculating an HMM (Hidden Markov Model) output probability to calculate an output probability in a discrete HMM. The invention also relates to a speech recognition apparatus that employs the method of calculating an HMM output probability.

2. Description of Related Art

HMMs are widely used as phoneme models for speech recognition. Although speech recognition based on HMMs achieves a high recognition rate, disadvantageously, the amount of computation is large. In particular, calculation of an HMM output probability requires a large amount of computation, and accordingly, problems exist, such as a large memory space being required for computation.

A related art method, which is disclosed in "Speech Recognition Based on Hidden Markov Model", Journal of Acoustic Society of Japan, Vol. 42, No. 12 (1986), addresses or overcomes these problems. In this method, a feature vector sequence obtained by speech analysis of an input speech is vector quantized using a codebook created in advance, codes (labels) obtained are input to HMMs (e.g., phoneme HMMs) constituting each word and state output probabilities are obtained by table reference, and likelihoods obtained from the respective HMMs are compared with each other to recognize the speech.

In the method of speech recognition that employs vector quantization, a process for obtaining output probabilities of respective states by table reference is executed as follows.

An input speech is analyzed in a speech analysis unit in each predetermined period, obtaining a feature vector sequence $V_t$ (t is a frame number of input speech segmented on the basis of predetermined period, and $t=1, 2, \ldots, T$, where T denotes the number of frames) constituted of, for example, LPC cepstrum coefficients of a dimension on the order of ten to twenty. The feature vector sequence $V_t$ is quantized in a vector quantization unit using a codebook, outputting a code sequence $C_t$ for each frame number ($t=1, 2, \ldots$).

The codebook used herein is created from speech data including every phoneme, and denoting the codebook size by K, the value of a code $C_t$ associated with a frame number can be represented by a codebook label number k ($k=1, 2, \ldots, K$).

Now, denoting the probability of outputting a code $C_t$, in response to inputting the code $C_t$, in a transition from a state i to another state j in an HMM of a phoneme by $b_{ij}(C_t)$, since the codebook size is K and the value of a code $C_t$ associated with a frame number can be represented by the codebook label number k ($k=1, 2, \ldots, K$) in this case, output probabilities $b_{ij}(k)$ of outputting the label numbers 1 to K are to be obtained.

Thus, by storing in tables the probability of outputting the label number 1, the probability of outputting the label number 2, ..., and the probability of outputting the label number K in each state transition of each phoneme HMM, output probabilities in each state transition can be obtained only by table reference based on the label numbers.

SUMMARY OF THE INVENTION

As described above, the method of speech recognition based on vector quantization significantly reduces the amount of computation compared with a method in which vector quantization is not employed, such as a continuous distribution HMM, and is advantageous in that calculation time is reduced and memory area required for calculation is significantly reduced. On the other hand, it is inferior in recognition ability due to vector quantization error. In particular, recognition ability in speech recognition of an unspecified speaker is inadequate.

Vector quantization error can be reduced by considerably increasing the codebook size. However, an excessive codebook size causes an increase in the amount of computation for quantization and requires a large memory area, so that advantages of vector quantization will be lost.

Furthermore, since a related art codebook is created from speech data to learn in which all phonemes are included, the codebook is averaged so as to cover various speech. Accordingly, the codebook size inevitably becomes large in order to enhance recognition ability.

Furthermore, even code data corresponding to speech data that does not significantly affect recognition ability is held, unnecessarily increasing the codebook size.

Accordingly, the present invention provides a method of calculating an HMM output probability that allows an HMM output probability to be obtained quickly with a small amount of computation, and provides a speech recognition apparatus that achieves a high recognition ability by employing the method of calculating an HMM output probability even if the system is hardware-constrained.

In order to address or achieve the above, a method of calculating an HMM output probability according to the present invention is provided in which a feature vector obtained by speech analysis of an input speech is vector quantized using vector quantization devices and a state output probability in accordance with a result of quantization is obtained by referring to tables. The vector quantization devices used for vector quantization are vector quantization devices associated with respective subwords, and the tables are provided in association with the vector quantization devices associated with the subwords, and the feature vector obtained by speech analysis of the input speech is vector quantized using one of the vector quantization devices associated with subwords, a result of quantization is output, and a state output probability in accordance with the result of quantization is obtained by referring to a table associated with the vector quantization means that has output the result of quantization.

In the method of calculating an HMM output probability, the subwords are phonemes, vector quantization devices associated with phonemes are created, and the vector quantization devices associated with phonemes are associated with respective phoneme HMMs.

In the method of calculating an HMM output probability, the subwords are syllables, vector quantization devices associated with syllables are created, and the vector quantization devices associated with syllables are associated with respective syllable HMMs.

In the method of calculating an HMM output probability, the subwords may be vowels and consonants, and the vector quantization devices associated with subwords may be vector quantization devices created from vowels and vector quantization devices created from consonants.

Furthermore, in the method of calculating an HMM output probability, of the vector quantization devices associated with subwords, vector quantization devices that can be shared, if any, may be shared on the basis of each group of the respective subword HMMs.

In the method of calculating an HMM output probability, of the vector quantization devices associated with subwords, vector quantization devices that can be shared, if any, may be shared on the basis of each state of the respective subword HMMs.

Furthermore, in the method of calculating an HMM output probability, each of the vector quantization devices associated with subwords may have an optimal code size in accordance with the associated subword.

Furthermore, the method of calculating an HMM output probability may be such that, whether an input subword is a subword to be vector quantized is checked before performing vector quantization, and vector quantization is skipped if the input subword is not a subword to be vector quantized.

Furthermore, in the method of calculating an HMM output probability, the vector quantization devices may be codebooks.

A speech recognition apparatus according to the present invention is a speech recognition apparatus based on HMM for vector quantizing a feature vector obtained by speech analysis of an input speech using vector quantization devices, obtaining a state output probability in accordance with a result of quantization by referring to tables, and performing speech recognition using the state output probability as a parameter. The speech recognition apparatus includes a speech analysis unit to perform speech feature analysis of an input speech to output a feature vector sequence; a vector quantization device storage unit to store vector quantization devices associated with respective subwords; a vector quantization processing unit to vector quantize the feature vector sequence output from the speech analysis unit using the vector quantization devices associated with subwords, stored in the vector quantization storage device storage unit, and to output a result of quantization; a subword HMM storage unit including various parameters required for subword HMM calculation and tables to refer to state output probabilities, provided in association with the vector quantization devices associated with subwords; and a speech recognition processing unit to refer to the table associated with vector quantization devices used for vector quantization upon receiving a result of quantization from the vector quantization devices, to obtain a state output probability in accordance with the result of quantization, and to perform speech recognition using the state output probability as a parameter to output a result of recognition.

In the speech recognition apparatus, the subwords are phonemes, vector quantization devices associated with phonemes are created, and the vector quantization devices associated with phonemes are associated with respective phoneme HMMs.

In the speech recognition apparatus, the subwords are syllables, vector quantization devices associated with syllables are created, and the vector quantization devices associated with syllables are associated with respective syllable HMMs.

In the speech recognition apparatus, the subwords may be vowels and consonants, and the vector quantization devices associated with subwords may be vector quantization devices created from vowels and vector quantization devices created from consonants.

In the speech recognition apparatus, of the vector quantization devices associated with subwords, vector quantization devices that can be shared, if any, may be shared on the basis of each group of the respective subword HMMs.

In the speech recognition apparatus, of the vector quantization devices associated with subwords, vector quantization devices that can be shared, if any, may be shared on the basis of each state of the respective subword HMMs.

In the speech recognition apparatus, each of the vector quantization devices associated with subwords may have an optimal code size in accordance with the associated subword.

In the speech recognition apparatus, the arrangement may be such that a word/language table is provided, whether an input subword is a subword to be vector quantized is checked by referring to the word/language table before the vector quantization unit performs vector quantization, and vector quantization is skipped if the input subword is not a subword to be vector quantized.

Furthermore, in the speech recognition apparatus, the vector quantization devices may be codebooks.

As described above, according to the present invention, vector quantization devices used for vector quantization are associated with respective subwords (phonemes or syllables constituting words or languages are herein referred to as subwords).

Since the vector quantization devices associated with subwords are created mainly from speech data associated with respective subwords, the vector quantization devices appropriately represent distribution of feature vectors of input speech. By using the vector quantization devices associated with subwords for vector quantization, vector quantization error is reduced or minimized.

Furthermore, since the vector quantization devices associated with subwords appropriately represent distribution of feature vectors of input speech as described above, a high ability of recognition is achieved. Furthermore, since the code sizes are reduced, the amount of computation is reduced. Furthermore, since the sizes of tables to store output probabilities is reduced, a memory area to be used is also reduced.

Furthermore, when phonemes are used as subwords, vector quantization devices are created in association with phonemes, so that the vector quantization devices are in accordance with distribution of feature vectors of the respective phonemes. Use of the vector quantization devices for vector quantization reduces or minimizes vector quantization error.

When syllables are used as subwords, vector quantization devices are created in association with syllables, so that the vector quantization devices are in accordance with distribution of feature vectors of the respective syllables. Use of the vector quantization devices for vector quantization reduces or minimizes vector quantization error.

Furthermore, the vector quantization devices associated with subwords may be vector quantization devices created from vowels and vector quantization devices created from consonants. Accordingly, vector quantization error is reduced compared with related art vector quantization devices created from speech data including every phoneme.

Furthermore, if vector quantization devices that can be shared among some of the respective subword HMMs exist among the vector quantization devices associated with subwords, the vector quantization devices may be shared. Accordingly, the number of vector quantization devices can be reduced, so that the overall data size of vector quantization devices can be reduced, serving to reduce the amount of computation and a memory area to be used.

Furthermore, if vector quantization devices that can be shared on the basis of each state of the subword HMMs exist among the vector quantization devices associated with subwords, the vector quantization devices may be shared. Accordingly, for example, when vector quantization devices are prepared for respective syllables, vector quantization devices can be shared on the basis of each state of the respective syllable HMMs, so that the overall data size of vector quantization devices can be significantly reduced. Accordingly, the amount of computation and a memory area to be used can be reduced.

Furthermore, each of the vector quantization devices associated with subwords may have an optimal code size in accordance with the associated subword. Accordingly, the vector quantization devices are optimal in accordance with the respective subwords, allowing vector quantization suitable for the respective subwords. This serves to further enhance ability of recognition, and allows code size to be reduced or minimized for subwords that do not significantly affect recognition ability, serving to save inefficiency in the size of vector quantization devices.

Furthermore, the arrangement may be such that, whether an input subword is a subword to be vector quantized is checked by referring to the word/language table before the vector quantization unit performs vector quantization, and vector quantization is skipped if the input subword is not a subword to be vector quantized. Accordingly, unnecessary process is skipped, serving to enhance processing speed.

Furthermore, by using codebooks as the vector quantization devices, the amount of computation for vector quantization is reduced.

By the method of calculating an HMM output probability according to the present invention, an output probability can be obtained with a small amount of computation and a small vector quantization error. Accordingly, by applying the method of calculating an HMM output probability, a speech recognition apparatus with a high ability of recognition can be implemented, even if the system is hardware constrained.

DETAILED DESCRIPTION OF PREFERRED EMBODIMENTS

Embodiments of the present invention are described below. The description of the embodiments relates to a method of calculating an HMM output probability according to the present invention and also relates to a speech recognition apparatus that employs the method of calculating an HMM output probability.

Figure 1:
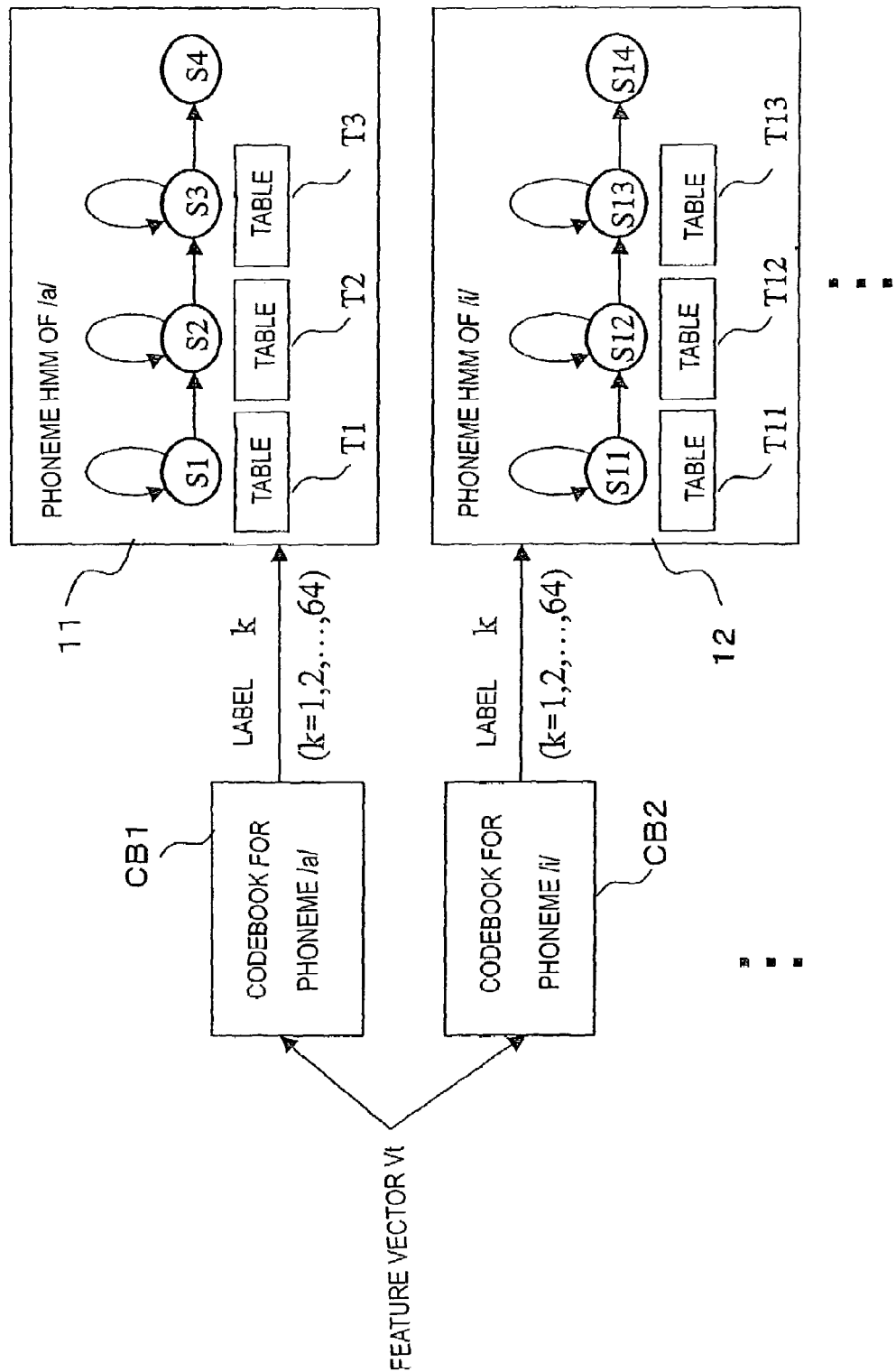
FIG. 1 is a schematic explaining a basic process of the present invention, in which vector quantization is performed based on codebooks associated with subwords and an output probability, which is a parameter required for speech recognition, is obtained by table reference, and explains a case where phonemes are used as subwords.
Figure 2:
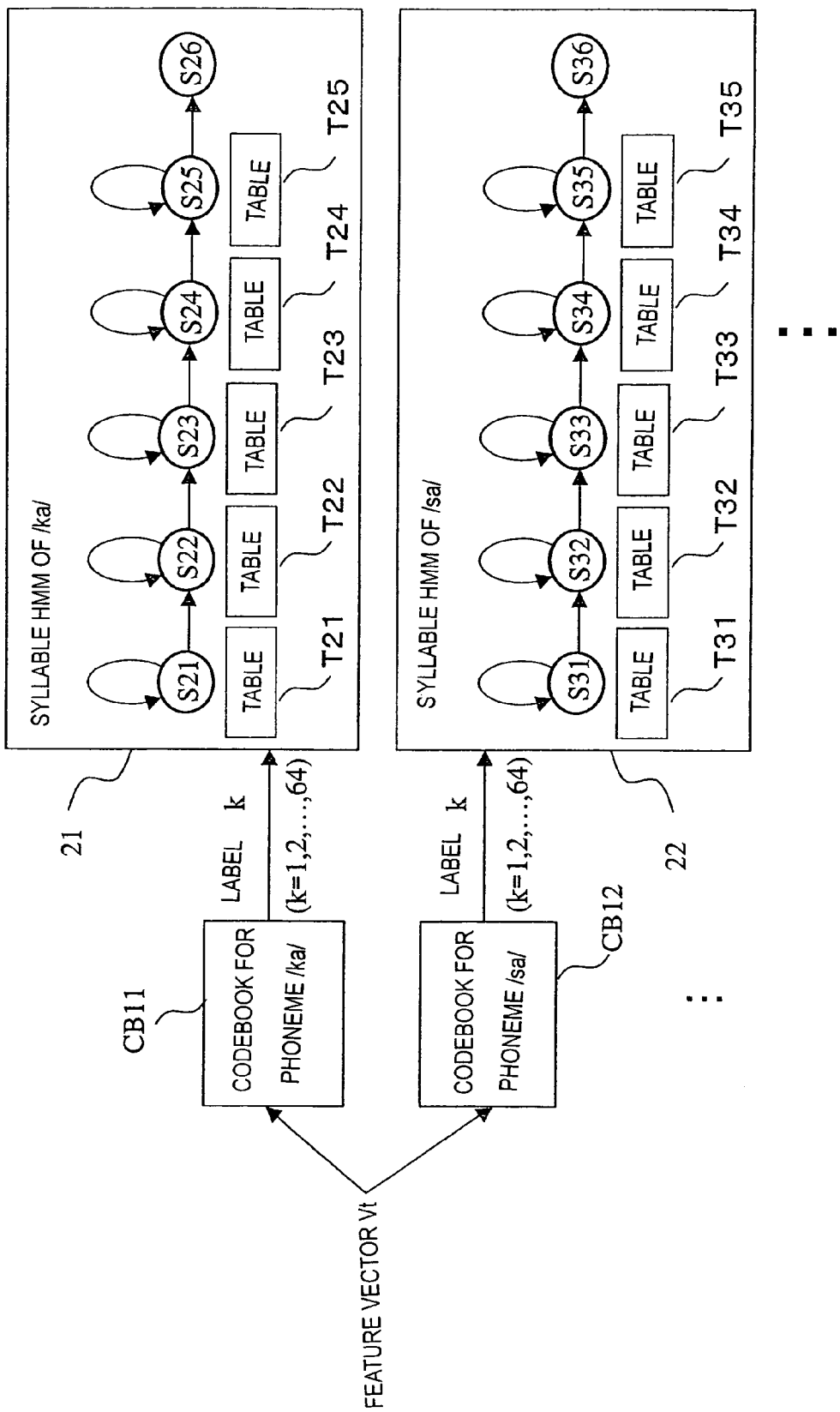
FIG. 2 is a schematic explaining a case where syllables are used as subwords in FIG. 1.

FIGS. 1 and 2 are schematics explaining a process of creating vector quantization devices associated with subwords (codebooks are used as vector quantization devices in this embodiment), executing vector quantization using the codebooks associated with subwords, and obtaining an output probability, which is a parameter required for speech recognition, by table reference. FIG. 1 explains a process in which subwords are phonemes, vector quantization is executed using codebooks associated with the respective phonemes, and an output probability is obtained by table reference using a code that is obtained as a result of quantization.

In this embodiment, twenty-six phonemes including vowels and consonants are used, and codebooks associated with the phonemes are created, each with a codebook size (the number of codes K) of K=64.

The respective codebooks associated with the phonemes are associated with respective phoneme HMMs such that, referring to FIG. 1, for example, a codebook CB1 is associated with a phoneme HMM 11 of /a/, and a codebook CB2 is associated with a phoneme HMM 12 of /i/. In FIG. 1, only phonemes /a/ and /i/ are shown for simplicity of illustration.

Assuming that the phoneme HMM 11 of /a/ is represented by four states and three loops, the phoneme HMM 11 has state output probability tables (hereinafter "tables") T1, T2, and T3 for respective state transitions.

That is, the table T1 is associated with state transition from a state S1 to a state S2, the table T2 is associated with state transition from the state S2 to a state S3, and the table T3 is associated with state transition from the state T3 to a state T4.

Of the states S1, S2, S3, and S4, the states S1, S2, and S3, respectively, have self-looping transitions (from state S1 to state S1, from state S2 to state S2, and from state S3 to state S3). The table T1 is used for state transition from state S1 to state S1, the table T2 is used for state transition from state S2 to state S2, and the table T3 is used for state transition from state S3 to state S3.

In this case, since the codebook size K=64, a label k (k is a label number) representing a code Ct output from the codebook CB 1 takes on one of the values k=1, 2, . . . 64, and each of the tables T1, T2, and T3 stores output probabilities corresponding to the label k=1, 2, . . . , 64.

Similarly to the phoneme /a/, the HMM 12 of the phoneme /i/ has tables T11, T12, and T13 for respective state transitions. The table T11 is associated with state transition from a state S11 to a state S12, the table T12 is associated with state transition from the state S12 to a state S13, and the table T13 is associated with state transition from the state S13 to a state S14. Also in this case, the tables T11, T12, and T13 are also used for self-looping transitions of the states S11, S12, and S13, respectively.

Also in this case, since the codebook size is K=64, a label k (k is a label number) representing a code Ct output from the codebook CB2 takes on one of the values k= 1, 2, . . . , 64, and each of the tables T11, T12, and T13 stores output probabilities corresponding to the label k=1, 2, . . . , 64.

An input speech is analyzed in each predetermined period to obtain a feature vector sequence Vt (t is a frame number of input speech segmented on the basis of the predetermined period, and t=1, 2, . . . , T, where T denotes the number of frames of input speech) constituted of LPC cepstrum coefficients having a dimension on the order of ten to twenty. Assuming that when the feature vector sequence Vt is vector quantized using the codebooks CB1, CB2, . . . that have been created for respective phonemes, k=24 is output as a label k representing a code Ct from the codebook CB1 associated with the phoneme /a/.

When the label k=24 is input to the phoneme HMM 11 of /a/, for example, a probability of outputting (output probability of) a code Ct in state transition from state S1 to state S2 can be obtained by referring to the table T1.

Thus, an output probability of outputting a code Ct obtained by vector quantizing a feature vector Vt (t=1, 2, . . . ) of a frame based on the codebook CB1 of the phoneme /a/ can be obtained by referring to the tables T1, T2, and T3 associated with the respective states of the phoneme HMM 11 of the phoneme /a/.

Similarly, a feature vector Vt of a frame, obtained by feature analysis of an input speech, is vector quantized based on the codebooks CB1, CB2, . . . that have been created for respective phonemes. It can be assumed that k=13 is output from the codebook CB2 of the phoneme /i/ as a label k representing a code Ct.

When the label k=13 is input to the phoneme HMM 12 of /i/, for example, a probability of outputting (output probability of) a code Ct in state transition from state S11 to state S12 can be obtained by referring to the table T11.

Thus, an output probability of outputting a code Ct obtained by vector quantizing a feature vector Vt (t=1, 2, . . . ) of a frame based on the codebook CB2 of the phoneme /i/ can be obtained by referring to the tables T11, T12, and T13 associated with the respective states of the phoneme HMM 12 of the phoneme /i/.

As described above, in the example shown in FIG. 1, the codebooks CB1, CB2, . . . associated with the respective phonemes are prepared for the respective phoneme HMMs, a feature vector Vt of a frame, obtained by feature analysis of an input speech, is output as a label obtained by coding based on an associated codebook, and the label is assigned to the phoneme HMM associated with the codebook, so that an output probability in each state of the phoneme HMM can be obtained by referring to tables provided in association with the respective states.

The codebooks CB1, CB2, . . . associated with the respective phonemes are in accordance with distributions of feature vector for the respective phonemes, and therefore represent the phonemes properly. Thus, the code size K of the codebook on the order of K=64 is sufficient to achieve practically adequate performance. Thus, twenty-six codebooks are required for twenty-six phonemes as described herein, and the overall codebook size of the twenty-six codebooks is only 26×64=1664.

Comparison of codebooks created for the respective phonemes, each codebook for a phoneme having a code size K of 64, with a related art single codebook created from speech data including all the phonemes has revealed that use of codebooks for the respective phonemes according to the present invention achieves enhanced performance of recognition compared with a related art codebook having a size of 2048, and achieves performance of recognition equivalent to that of a related art codebook having a size of 4096.

Furthermore, it is revealed that, even if the code size of the codebook CB1, CB2, . . . is reduced to 32, which is one half of the code size 64 mentioned above, better performance of recognition is achieved compared with a related art codebook with a size of 1024, and performance of recognition equivalent to that of a conventional codebook with a size of 2048 is achieved. Thus, with the code size of the codebooks CB1, CB2, . . . being 32, the overall codebook size is further reduced, in this case, only 26×32=832.

Furthermore, the code sizes of the codebooks associated with the respective phonemes may be the same for all the phonemes, or may be set arbitrarily for each of the phonemes, which allows optimization of enhancement on a phoneme-by-phoneme basis.

By using codebooks associated with phonemes as described above, high performance of recognition is achieved with a small code size, and reduction in code size allows reduction in the amount of computation for vector quantization, and size of tables to store output probabilities is reduced, so that a smaller memory area suffices.

Although the above description has been made in relation to a case where subwords are phonemes, a case where subwords are syllables can be considered similarly. A case where subwords are syllables is described below with reference to FIG. 2.

FIG. 2 shows a process in which syllables are used as subwords and vector quantization is performed using codebooks associated with the respective syllables, and in which an output probability is obtained by table reference using a code obtained by quantization.

For convenience of description, the codebook size (the number of codes K) of each of the codebooks associated with syllables is K=64, similarly to FIG. 1.

The respective codebooks associated with syllables are associated with respective syllable HMMs, such that, referring to FIG. 2, for example, a codebook CB11 is associated with a syllable HMM 21 of /ka/, and a codebook CB12 is associated with a syllable HMM 22 of /sa/, as shown in FIG. 2. In FIG. 2, for simplicity of illustration, only the syllables /ka/ and /sa/ are shown.

Assuming that the HMM 21 of the syllable /ka/ is represented by six states and five loops, the HMM 21 has tables (T21 to T25 in this case) for respective state transitions, similarly to the example shown in FIG. 1.

Also in this case, similarly to FIG. 1, since the codebook size (the number of codes K) is K=64, a label k (k is a label number) representing a code Ct output from the codebook CB11 takes on one of the values k=1, 2, . . . , 64, and each of the tables T21 to T25 stores output probabilities corresponding to the label k=1, 2, . . . , 64, respectively.

Similarly to the syllable /ka/, assuming that the syllable HMM 22 of the syllable /sa/ is represented by six states and five loops, the syllable HMM 22 has tables T31 to T35 for respective state transitions. Also in this case, since the codebook size is 64, a label k (k is a label number) representing a code Ct output from the codebook CB12 takes on one of the values k=1, 2, . . . , 64, and each of the tables T31 to T35 stores output probabilities corresponding to the label k=1, 2, . . . , 64, respectively.

An input speech is analyzed in each predetermined period to obtain a feature vector sequence Vt (t is a frame number of input speech segmented on a basis of the predetermined period, and t=1, 2, . . . , T, where T denotes the number of frames of input speech) constituted of, for example, LPC cepstrum coefficients having a dimension on the order of ten to twenty. The feature vector sequence Vt is vector quantized using the codebooks CB11, CB12, . . . created for the respective syllables. It can be assumed that a label k=42 representing a code Ct is output from the codebook CB11 associated with the syllable /ka/.

When the label k=42 is input to the syllable HMM 21 of /ka/, for example, a probability of outputting (output probability of) a code Ct in a state transition from state S21 to state S22 can be obtained by referring to the table T21.

Thus, an output probability of outputting a code Ct obtained by vector quantizing a feature vector Vt (t=1, 2, . . . ) of a frame based on the codebook CB11 of the syllable /ka/ can be obtained by referring to the tables T21, T22, T23, T24, and T25 associated with the respective states of the syllable HMM 21 of the syllable /ka/.

Similarly, assuming that when a feature vector Vt of a frame, obtained by feature analysis of an input speech, is vector quantized using the codebooks CB11, CB12, . . .

created for the respective syllables, a label k=31 representing a code Ct is output from the codebook CB12 of the syllable /sa/.

When the label k=31 is input to the syllable HMM 22 of /sa/, for example, a probability of outputting (output probability of) a code Ct in a state transition from state S31 to state S32 can be obtained by referring to the table T31.

Thus, an output probability of outputting a code Ct obtained by vector quantizing a feature vector Vt (t=1, 2, . . . ) based on the codebook CB12 of the syllable is /sa/ can be obtained by referring to the tables T31, T32, T33, T34, and T35 associated with the respective states of the syllable HMM 22 of the syllable /sa/.

As described above, in the example shown in FIG. 2, the codebooks CB11, CB12, . . . for the respective syllables are associated with the syllable HMMs for the respective syllables, a feature vector Vt of a frame, obtained by feature analysis of an input speech, is output as a label by coding based on an associated codebook, and the label is assigned to the syllable HMM associated with the codebook. Accordingly, an output probability in each state of the syllable HMM can be obtained by referring to tables provided for the respective states.

Also in this case, the code sizes of the codebooks for the respective syllables may be the same for all the syllables, or may be set arbitrarily, which allows optimization or enhancement on a syllable-by-syllable basis.

Although a process of creating codebooks for respective phonemes or codebooks for respective syllables when subwords are phonemes or syllables, vector quantizing a feature vector based thereon, and calculating output probabilities by table reference has been described above, the present invention allows some of the codebooks associated with respective subwords to be shared on the basis of each state of the respective subword HMMs. This is described below in the context of an example where codebooks are shared on the basis of each state of several syllable HMMs.

FIGS. 3(a)–3(d) show respective syllable HMM models of, for example, /ka/, /sa/, /ki/, and /ku/, among a large number of syllables. FIG. 3(a) shows a syllable HMM model of /ka/, FIG. 3(b) shows a syllable HMM model of /sa/, FIG. 3(c) shows a syllable HMM model of /ki/, and FIG. 3(d) shows a syllable HMM model of /ku/.

In the HMM models, for example, it can be assumed that the syllable HMM of /ka/ is segmented such that the states S21 and S22 correspond to parts representing /k/ and the states S23 to S26 correspond to parts representing /a/, as shown in FIG. 3(a), and that the syllable HMM of /sa/ is segmented such that the states S31 and S32 correspond to parts representing /s/ and the states S33 to S36 correspond to parts representing /a/, as shown in FIG. 3(b).

Furthermore, it can be assumed that the syllable HMM of /ki/ is segmented such that the states S41 and S42 correspond to parts representing /k/ and the states S43 to S46 correspond to parts representing /i/, as shown in FIG. 3(c), and that the syllable HMM of /ku/ is segmented such that the states S51 and S52 correspond to parts representing /k/ and the states S53 to S56 correspond to parts representing /u/, as shown in FIG. 3(d).

As described above, the respective states of each of the syllable HMMs are divided in association with the respective syllables, so that codebooks of phonemes associated with the respective states of the syllable HMMs can be shared on the basis of each state.

For example, in the syllable HMMs, a codebook for /a/ is shared between the states S23 to S26 representing /a/ in the syllable HMM of /ka/ shown in FIG. 3(a) and the states S33 to S36 representing /a/ in the syllable HMM of /sa/ shown in FIG. 3(b).

Furthermore, in the syllable HMMs, a codebook for /k/ is shared among the states S21 and S22 representing /k/ in the syllable HMM of /ka/ shown in FIG. 3(a), the states S41 and S42 representing /k/ in the syllable HMM of /ki/ shown in FIG. 3(c), and the states S51 and S52 representing /k/ in the syllable HMM of /ku/ shown in FIG. 3(d).

Accordingly, for example, when calculating an output probability in the syllable HMM of /ka/, in the initial states S21 and S22, the shared codebook for /k/ is used, and table reference is made using a code (label) obtained by vector quantization based on the codebook for /k/; whereas in the latter states S23 to S26, the shared codebook for /a/ is used, and table reference is made using a code (label) obtained by vector quantization based on the codebook for /a/, whereby an output probability is obtained.

Thus, codebooks can be shared on the basis of the respective states of the syllable HMMs for the respective syllables, so that, for example, twenty to thirty codebooks are sufficient for about 110 syllables, equivalently to phonemes.

When codebooks are shared on the basis of the respective states of the syllable HMMs, for example, although a state representing /a/ exists in each of the syllable HMM of /ka/ and the syllable HMM of /sa/, since /k/ is present immediately before /a/ in the syllable HMM of /ka/, whereas /s/ is present immediately before /a/ in the syllable HMM of /sa/ although /a/ is the same, it is ideal to use codebooks of /a/ in which relationships with preceding and following phonemes are considered. However, a codebook for /a/ without considerations thereof is sufficient to achieve adequate results.

Furthermore, although a process for determining which state represents which phoneme in each of the syllable HMMs, setting segmentation, and determining a codebook to be shared can be executed based on human experiential knowledge, which codebook is to be shared between which states of which syllable HMMs may be determined by automatically determining which state represents which phoneme in a syllable HMM, for example, by calculation using a computer.

Figure 3:
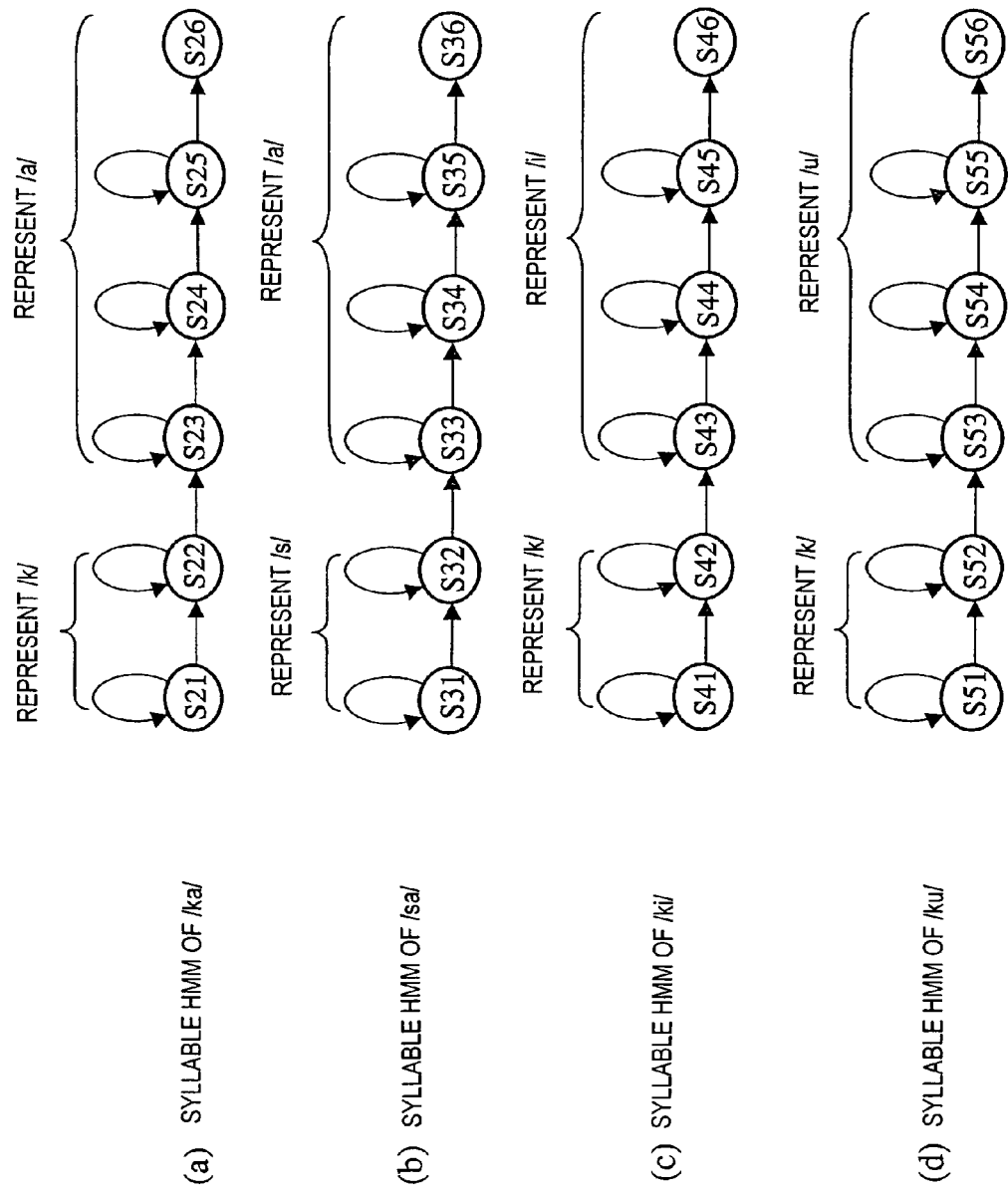
FIGS. 3(a)–3(d) are schematics explaining an example in which a codebook is shared on the basis of each of several states of syllable HMMs in a case where syllables are used as subwords.

Although segmentation is simply between the first two states and the latter four states in the example shown in FIG. 3 for convenience of description, in many cases, the point of segmentation differs among the respective syllable HMMs, for example, such that the states S21 and S22 represent /k/ in the syllable HMM of /ka/ and the state S23 and subsequent states represent /a/, whereas the states S31 and S32 represent /s/ and the state S34 and subsequent states represent /a/ in the syllable HMM of /sa/ as described above.

Thus, codebooks of subwords are shared, if allowed, on the basis of states of the respective subword HMMs (syllable HMMs in the above example), serving to reduce the overall codebook size significantly. Accordingly, the amount of computation is reduced, and furthermore, high ability of recognition is maintained.

Figure 4:
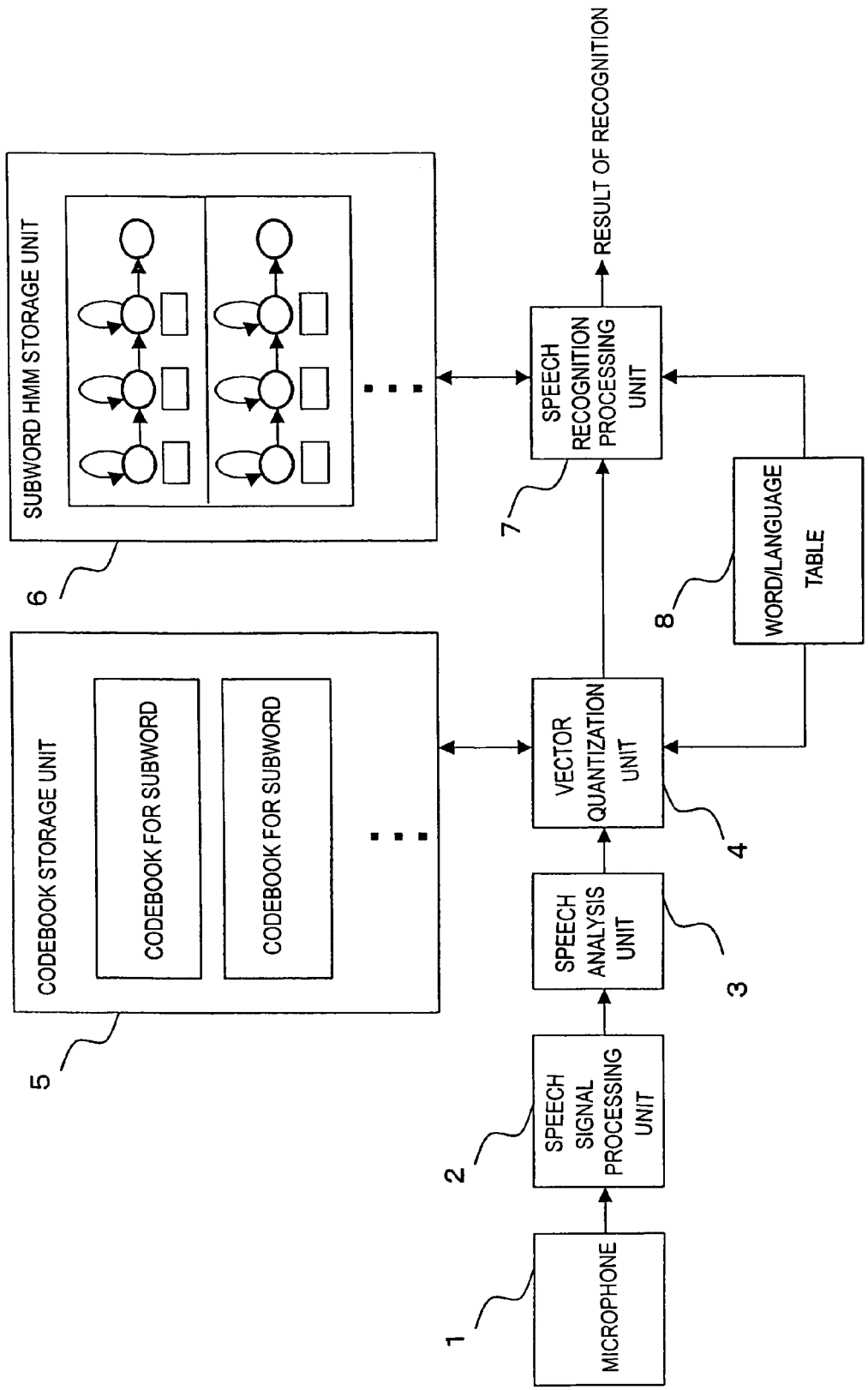
FIG. 4 is a schematic of a speech recognition apparatus according to the present invention.

FIG. 4 is a schematic of a speech recognition apparatus according to the present invention. The speech recognition apparatus includes a microphone 1 that serves as speech input device to input a speech; a speech signal processing unit 2 for amplification and A/D conversion of an input speech signal; a speech analysis unit 3 to analyze the speech signal having been processed by the speech signal input processing unit 2 in each predetermined period to output a feature vector sequence Vt (t is a frame number of input speech segmented on the basis of the predetermined period, and t=1, 2, ..., T, where T denotes the number of frames) constituted of, for example, LPC cepstrum coefficients of a dimension on the order of ten to twenty; a vector quantization processing unit 4 to vector quantize the feature vector Vt for each frame, analyzed by the speech analysis unit 3; a codebook storage unit 5 to store vector quantization means (codebooks in this embodiment) associated with subwords, used in vector quantization by the vector quantization processing unit 4; a subword HMM storage unit 6 to store various parameters needed for subword HMM calculation and state output probability tables described above; a speech recognition processing unit 7 to execute speech recognition using data stored in the subword HMM storage unit 6 and a code (label) output from the vector quantization unit 4, and to output a result of recognition; and a word/language table 8 that is referred to when the speech recognition processing unit 7 and the vector quantization processing unit 4 execute their respective processes.

The word/language table 8 is used when the speech recognition unit 7 determines whether unnaturalness is present in the result of recognition in the course of the speech recognition process and when the vector quantization processing unit 4 determines to skip the vector quantization process for unnecessary subwords in the course of the vector quantization process.

For example, if it suffices for the speech recognition apparatus to recognize only a very limited number of words or languages, the words and languages are stored in the word/language table 8. The word/language table 8 is referred to in the course of speech recognition, so that it is possible to skip vector quantization for subwords for which speech recognition is not required.

Conversely, if recognition of a large number of words or languages or recognition of continuous speech is required, input speech is sequentially processed. In that case, a word to be recognized in a current stage of processing is determined by referring to the word/language table 8. If a subword is determined as unnecessary at the stage in the course of speech recognition, it is possible to skip vector quantization for the subword.

The codebooks associated with subwords, stored in the codebook storage unit 5, are, for example, codebooks created for respective phonemes if phonemes are used as subwords, and the codebooks are associated with respective subword phoneme HMMs stored in the subword HMM storage unit 6 (FIG. 1).

If syllables are used as subwords, the codebooks stored in the codebook storage unit 5 are codebooks created for respective syllables, and the codebooks are associated with respective syllable HMMs (FIG. 2).

As described above, some of the codebooks associated with subwords, if allowed, may be shared on the basis of states of subword HMMs.

In the construction described above, an input speech signal having undergone amplification and A/D conversion in the speech signal processing unit 2 is analyzed in the speech analysis unit 3. A feature vector Vt of a frame corresponding to a time, obtained by the analysis, is vector quantized using codebooks created for respective subwords. It can be assumed that a label value k representing a code Ct is output from a codebook associated with a subword.

By inputting the label value k to the associated subword HMM, a probability of outputting (output probability of) a code Ct in a state transition from state i to state j can be obtained by referring to a table associated with the state transition ij.

Thus, output probabilities of outputting a code Ct in the respective states can be obtained by referring to tables associated with the respective states, and a determinate output probability is obtained by performing the above for a feature vector of each frame corresponding to each time of input speech, and the speech recognition unit 7 executes speech recognition based thereon.

As described above, the vector quantization processing unit 4 refers to the word/language table 8 in the course of the vector quantization process to skip vector quantization for unnecessary subwords, and the speech recognition processing unit 7 also referring to the word/language table 8 determines whether unnaturalness is present in the result of recognition in the course of the speech recognition process.

As described hereinabove, in this embodiment, codebooks are prepared for phonemes or syllables serving as subwords, so that each of the codebooks can be adapted to distribution of feature vectors of phonemes or syllables. Accordingly, although the size of each of the codebooks is small, quantization error in vector quantization is reduced or minimized. Furthermore, sizes of tables that are referred to to obtain a probability of outputting (output probability of) a code obtained by vector quantization can also be reduced in accordance with the sizes of the codebooks.

Thus, codebook sizes and table sizes are reduced, so that the amount of computation is significantly reduced, and a memory area to be used is also reduced. Furthermore, a high ability of speech recognition is achieved while reducing codebook sizes and table sizes.

Furthermore, codebooks may be shared on the basis of each state of subword HMMs associated with the respective subwords. In particular, when syllables are used as subwords, codebooks that can be shared, if any, are shared on the basis of each state of respective syllable HMMs, so that twenty to thirty codebooks suffice for all the syllables, equivalently to phonemes.

The present invention is not limited to the embodiment described hereinabove, and various modifications are possible without departing from the spirit of the present invention. For example, although codebooks for respective phonemes or codebooks for respective syllables are prepared as codebooks for respective subwords in the embodiment described above, without limitation thereto, for example, the arrangement may be such that a codebook is prepared for vowels and a codebook is prepared for consonants. These are rather rough codebooks compared with codebooks for respective phonemes or codebooks for respective syllables. However, compared with a related art codebook created from all speeches, a high ability of recognition is achieved without considerably increasing the codebook size.

Furthermore, although sharing of codebooks in the embodiment has been described in the context of an example where a codebook is shared on the basis of each state of subword HMMs (e.g. syllable HMMs), instead of each state of subword HMMs, codebooks may be shared on the basis of a group of some subword HMMs, for example, between a phoneme HMM of /a/ and a phoneme HMM of /i/.

Furthermore, although the embodiment has been described in the context of an example where codebooks are used as vector quantization devices, other vector quantization devices may be used.

Furthermore, according to the present invention, a processing program defining a processing procedure to implement the present invention described hereinabove may be created and recorded on a recording medium, such as a floppy disk, an optical disk, or a hard disk, and the recording medium having recorded the processing program thereon is within the scope of the present invention. Alternatively, the processing program may be obtained via a network.

As described hereinabove, vector quantization devices used for vector quantization are associated with respective subwords. The vector quantization devices associated with respective subwords are created from speech data corresponding to the respective subwords, so that the vector quantization devices appropriately represent distribution of feature vectors of input speech. By using the vector quantization devices associated with subwords for vector quantization, vector quantization error is reduced or minimized. Accordingly, by incorporating the method of calculating an output probability in a speech recognition apparatus, a high ability of recognition is achieved. Furthermore, since the code sizes of individual vector quantization devices are reduced, the sizes of tables to store output probabilities can also be reduced, serving to reduce a memory area to be used.

Furthermore, if vector quantization devices that can be shared among some of the respective subword HMMs exist among the vector quantization devices associated with subwords, the vector quantization devices may be shared. Accordingly, the number of vector quantization devices can be reduced, so that the overall data size of vector quantization devices can be reduced, serving to reduce the amount of computation and a memory area to be used.

Furthermore, if vector quantization devices that can be shared on the basis of each state of the subword HMMs exist among the vector quantization devices associated with subwords, the vector quantization devices may be shared. Accordingly, for example, when vector quantization devices are prepared for respective syllables, vector quantization devices can be shared on the basis of each state of the respective syllable HMMs, so that the overall data size of vector quantization devices can be significantly reduced. Accordingly, the amount of computation and a memory area to be used can be reduced.

As described above, by a method of calculating an HMM output probability according to the present invention, an output probability can be obtained with a small amount of computation and a small vector quantization error. Accordingly, by applying the method of calculating an HMM output probability, a speech recognition apparatus with a high ability of recognition can be implemented, even if the system is hardware constrained.

The invention claimed is:

1. A method of calculating an HMM output probability, comprising:
   performing vector quantization, using vector quantization devices, of a feature vector obtained by speech analysis of an input speech; and
   obtaining a state output probability in accordance with a result of quantization by referring to tables;
   the vector quantization devices being associated with respective subwords, and the tables being provided in association with the vector quantization devices associated with the subwords, and
   the feature vector obtained by speech analysis of the input speech being vector quantized using one of the vector quantization devices associated with subwords, a result of quantization being output, and a state output probability in accordance with the result of quantization being obtained by referring to a table associated with the vector quantization devices that has output the result of quantization.

2. The method of calculating an HMM output probability according to claim 1, the subwords being phonemes, vector quantization devices associated with phonemes being created, and the vector quantization devices associated with phonemes being associated with respective phoneme HMMs.

3. The method of calculating an HMM output probability according to claim 1, the subwords being syllables, vector quantization devices associated with syllables being created, and the vector quantization devices associated with syllables being associated with respective syllable HMMs.

4. The method of calculating an HMM output probability according to claim 1, the subwords being vowels and consonants, and the vector quantization devices associated with subwords being vector quantization devices created from vowels and vector quantization devices created from consonants.

5. The method of calculating an HMM output probability according to claim 1, of the vector quantization devices associated with subwords, vector quantization devices that can be shared, if any, being shared on the basis of each group of the respective subword HMMs.

6. The method of calculating an HMM output probability according to claim 1, of the vector quantization devices associated with subwords, vector quantization devices that can be shared, if any, being shared on the basis of each state of the respective subword HMMs.

7. The method of calculating an HMM output probability according to claim 1, each of the vector quantization devices associated with subwords having an optimal code size in accordance with the associated subword.

8. The method of calculating an HMM output probability according to claim 1, whether an input subword is a subword to be vector quantized being checked before performing vector quantization, and vector quantization being skipped if the input subword is not a subword to be vector quantized.

9. The method of calculating an HMM output probability according to claim 1, the vector quantization devices being codebooks.

10. A speech recognition apparatus for vector quantizing a feature vector obtained by speech analysis of an input speech using vector quantization devices, obtaining a state output probability in accordance with a result of quantization by referring to tables, and performing speech recognition using the state output probability as a parameter, the speech recognition apparatus comprising:
    a speech analysis unit to perform speech feature analysis of an input speech to output a feature vector sequence;
    a vector quantization device storage unit to store vector quantization devices associated with respective subwords;
    a vector quantization processing unit to vector quantize the feature vector sequence output from the speech analysis unit using the vector quantization devices associated with subwords, stored in the vector quantization storage device storage unit, and to output a result of quantization;
    a subword HMM storage unit including various parameters required for subword HMM calculation and tables to refer to state output probabilities, provided in association with the vector quantization devices associated with subwords; and
    a speech recognition processing unit to refer to the table associated with vector quantization devices used for vector quantization upon receiving a result of quantization from the vector quantization devices, to obtain a state output probability in accordance with the result of quantization, and to perform speech recognition using the state output probability as a parameter to output a result of recognition.

11. The speech recognition apparatus according to claim 10, the subwords being phonemes, vector quantization devices associated with phonemes being created, and the vector quantization devices associated with phonemes being associated with respective phoneme HMMs.

12. The speech recognition apparatus according to claim 10, the subwords being syllables, vector quantization devices associated with syllables being created, and the vector quantization devices associated with syllables being associated with respective syllable HMMs.

13. The speech recognition apparatus according to claim 10, the subwords being vowels and consonants, and the vector quantization devices associated with subwords being vector quantization devices created from vowels and vector quantization devices created from consonants.

14. The speech recognition apparatus according to claim 10, of the vector quantization devices associated with subwords, vector quantization devices that can be shared, if any, being shared on the basis of each group of the respective subword HMMs.

15. The speech recognition apparatus according to claim 10, of the vector quantization devices associated with subwords, vector quantization devices that can be shared, if any, being shared on the basis of each state of the respective subword HMMs.

16. The speech recognition apparatus according to claim 10, each of the vector quantization devices associated with subwords having an optimal code size in accordance with the associated subword.

17. The speech recognition apparatus according to claim 10, a word/language table being provided, whether an input subword is a subword to be vector quantized being checked by referring to the word/language table before the vector quantization unit performs vector quantization, and vector quantization being skipped if the input subword is not a subword to be vector quantized.

18. The speech recognition apparatus according to claim 10, the vector quantization devices being codebooks.

* * * * *

UNITED STATES PATENT AND TRADEMARK OFFICE
CERTIFICATE OF CORRECTION

PATENT NO. : 7,058,576 B2  Page 1 of 1
APPLICATION NO. : 10/197461
DATED : June 6, 2006
INVENTOR(S) : Yasunaga Miyazawa and Hiroshi Hasegawa It is certified that error appears in the above-identified patent and that said Letters Patent is hereby corrected as shown below:

Column 14, Line 52
 Claim 10, replace "the vector quantization storage device storage unit, …" with -- "the vector quantization device storage unit,…"--

Signed and Sealed this

Fifteenth Day of August, 2006

JON W. DUDAS
*Director of the United States Patent and Trademark Office*